US009702479B2

(12) United States Patent
Nakamura et al.

(10) Patent No.: US 9,702,479 B2
(45) Date of Patent: Jul. 11, 2017

(54) ROTATIONALLY DRIVEN POPPET VALVE

(71) Applicant: TAIHO KOGYO CO., LTD., Toyota-shi, Aichi (JP)

(72) Inventors: Katsumi Nakamura, Toyota (JP); Keisuke Nakane, Toyota (JP); Takumi Fukaya, Toyota (JP); Koji Sugiura, Toyota (JP)

(73) Assignee: TAIHO KOGYO CO., LTD. (JP)

( * ) Notice: Subject to any disclaimer, the term of this patent is extended or adjusted under 35 U.S.C. 154(b) by 184 days.

(21) Appl. No.: 14/367,749

(22) PCT Filed: Dec. 27, 2012

(86) PCT No.: PCT/JP2012/083875
§ 371 (c)(1),
(2) Date: Jun. 20, 2014

(87) PCT Pub. No.: WO2013/100052
PCT Pub. Date: Jul. 4, 2013

(65) Prior Publication Data
US 2014/0374637 A1    Dec. 25, 2014

(30) Foreign Application Priority Data
Dec. 27, 2011  (JP) .................................. 2011-285186

(51) Int. Cl.
*F16K 31/53*      (2006.01)
*F16K 31/04*      (2006.01)
(Continued)

(52) U.S. Cl.
CPC ............. *F16K 31/53* (2013.01); *F02M 26/54* (2016.02); *F02M 26/67* (2016.02); *F16K 31/04* (2013.01)

(58) Field of Classification Search
CPC ... F16K 1/00; F16K 1/02; F16K 31/53; F16K 31/04; Y02T 10/121
See application file for complete search history.

(56) References Cited

U.S. PATENT DOCUMENTS 2,317,529 A * 4/1943 Hodgson ................. F16K 31/05
                                              74/89.45
3,616,884 A    11/1971 Balz
(Continued)

FOREIGN PATENT DOCUMENTS

EP    0305762 A1    3/1989
JP    2899394 B2    6/1999
(Continued)

*Primary Examiner* — Mary McManmon
*Assistant Examiner* — Daphne M Barry
(74) *Attorney, Agent, or Firm* — Harness, Dickey & Pierce, P.L.C.

(57)                ABSTRACT

Valve device is provided with poppet valve for opening and closing flow path. Thread part is formed on shaft of this poppet valve, and driving gear is screwed into this thread part. Driving gear is rotated via pinion by motor, and thereby the poppet valve is moved to advance and retreat so as to control opening and closing of the flow path. Driving gear is provided so as to be able to advance and retreat in the axial direction of the pinion and the axial direction of the poppet valve while remaining engaged with pinion, and is normally held at a predetermined non-operating position by spring (biasing means). With this, even when the poppet valve is seated on the valve seat and has stopped moving, the driving gear moves, when further rotated, against the biasing force of spring from the non-operating position in the axial direction, and absorbs an impact that is applied to the driving means or the like. Damage of the driving means and the like due to the impact load can be prevented.

4 Claims, 1 Drawing Sheet

(51) Int. Cl.
    *F02M 26/54*     (2016.01)
    *F02M 26/67*     (2016.01)

(56) References Cited

U.S. PATENT DOCUMENTS

| | | | | |
|---|---|---|---|---|
| 3,908,959 A | * | 9/1975 | Fichtner | F16J 15/50 251/129.03 |
| 5,029,806 A | * | 7/1991 | Huo-Lien | F16K 31/12 222/179 |
| 2011/0115319 A1 | * | 5/2011 | Schade | F16K 31/047 310/83 |

FOREIGN PATENT DOCUMENTS

| | | |
|---|---|---|
| JP | 2009-197765 A | 9/2009 |
| WO | WO-2011-059678 A1 | 5/2011 |

* cited by examiner

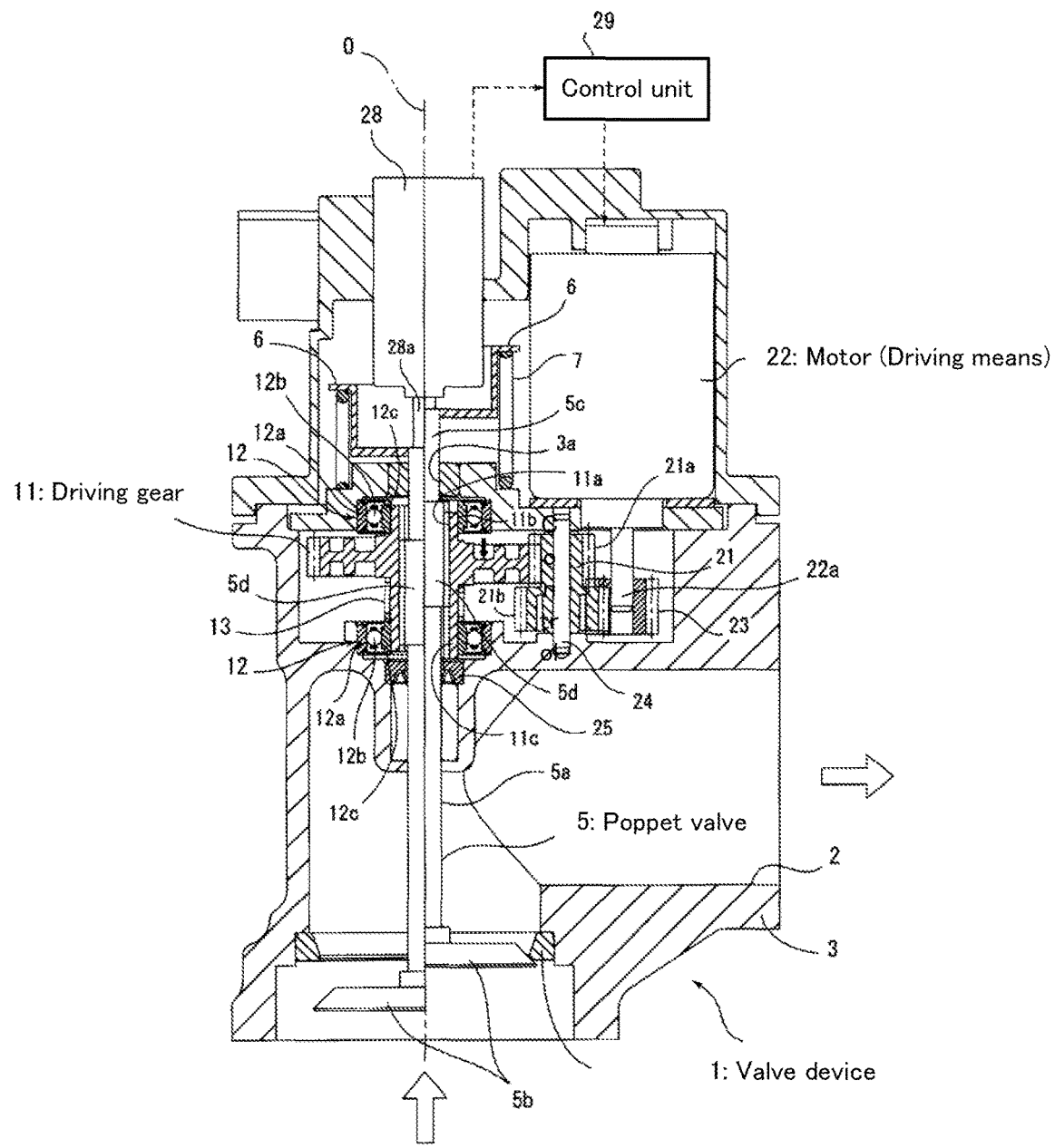

ROTATIONALLY DRIVEN POPPET VALVE

CROSS-REFERENCE TO RELATED APPLICATIONS

This application is a U.S. National Stage Application of International Application No. PCT/JP2012/083875 filed on Dec. 27, 2012, and published in Japanese as WO 2013/100052 A1 on Jul. 4, 2013. This application claims priority to Japanese Application No. 2011-285186 filed on Dec. 27, 2011. The entire disclosures of the above applications are incorporated herein by reference.

TECHNICAL FIELD

The present invention relates to a valve device, and in particular to a valve device that includes a poppet valve and a motor serving as driving means for driving the poppet valve, and is configured to prevent, when the poppet valve is seated on a valve seat, an impact from being transmitted to the motor serving as the driving means, a gear, and the like.

BACKGROUND ART

Conventionally, as a valve device, there is known a valve device that includes: a poppet valve that is brought into and out of contact with a valve seat to open and close a flow path; a thread part that is formed on a shaft of the poppet valve; a driving gear into which the thread part is screwed; a pinion that engages with and rotates the driving gear; and driving means for rotationally driving the pinion, wherein the poppet valve is moved to advance or retreat depending on the rotational direction of the driving gear to control opening and closing of the flow path, by the driving means rotating the driving gear via the pinion (JP 2009-197765 A).

In this valve device, in order to prevent an impact from being transmitted to the motor serving as the driving means and the like when the poppet valve is seated on the valve seat, a required clearance (gap) is created between the thread part formed on the shaft of the poppet valve and a thread part of the driving gear, and, even when the poppet valve is seated on the valve seat and has stopped moving, the driving gear is allowed, when further rotated, to rotate to the extent of the clearance and absorb an impact that is applied to the driving means or the like.

SUMMARY OF INVENTION

Technical Problem

In the above-described conventional device, since an impact that is applied to the driving means or the like is absorbed by the clearance created between the thread part formed on the shaft of the poppet valve and the thread part of the driving gear, there was a limit to how much the impact absorption capacity can be improved by enlarging this clearance.

In view of such circumstances, it is an object of the present invention to provide a valve device that can secure a higher impact absorption capacity than the conventional device.

Solution to Problem

That is, the present invention relates to a valve device that includes: a poppet valve that is brought into and out of contact with a valve seat to open and close a flow path; a thread part that is formed on a shaft of the poppet valve; a driving gear into which the thread part is screwed; a pinion that engages with and rotates the driving gear; and driving means for rotationally driving the pinion, wherein the poppet valve is moved to advance or retreat depending on a rotational direction of the driving gear to control opening and closing of the flow path, by the driving means rotating the driving gear via the pinion, the driving gear is provided so as to be able to advance and retreat in an axial direction of the pinion and an axial direction of the poppet valve while remaining engaged with the pinion, and the driving gear is held at a predetermined non-operating position by biasing means, and moves, when further rotated, against a biasing force of the biasing means from the non-operating position in an axial direction thereof even when the poppet valve is seated on the valve seat and has stopped moving, and absorbs an impact that is applied to the driving means.

Effects of Invention

According to the above-described configuration, the driving gear is held at a predetermined non-operating position by the biasing means, and, when in this state the pinion is rotationally driven in a forward or reverse direction by the driving means, the driving gear will be rotated in a forward or reverse direction via the pinion, and thus the poppet valve is moved to advance or retreat depending on a rotational direction of the driving gear, allowing opening and closing of the flow path to be controlled.

Furthermore, at the moment at which the poppet valve is seated on the valve seat to close the flow path, and has stopped moving, the driving means generally continues its operation due to the inertia force, and thus the driving gear further rotates even when the poppet valve is seated on the valve seat and has stopped moving. Accordingly, at that time, following the rotation of the driving gear, the driving gear moves in its axial direction from the predetermined non-operating position against the biasing force of the biasing means, and it is thus possible to absorb an impact that is applied to the driving means, the driving gear, or the pinion.

Furthermore, at that time, the driving gear moves in the axial direction of the pinion while remaining engaged with the pinion, and thus the engagement of the driving gear and the pinion is not released.

BRIEF DESCRIPTION OF THE DRAWINGS

FIG. 1 is a cross-sectional view illustrating an embodiment of the present invention with a non-operating state and an operating state of poppet valve 5 respectively shown on the right side and the left side of center line O of poppet valve 5.

DESCRIPTION OF EMBODIMENTS

Embodiment

Hereinafter, the present invention will be described with reference to the shown embodiment. In FIG. 1, valve device 1 is configured to be able to control opening and closing of flow path 2 through which exhaust gas is recirculated, and to control the amount of exhaust gas that is to flow back to an engine.

Flow path 2 is formed in housing 3 and has an L-shape. An opening of flow path 2 in the lower part of FIG. 1 is an exhaust gas inlet, and an opening on the right side is an exhaust gas outlet. Furthermore, valve seat 4, which surrounds flow path 2, is provided on the upstream side of flow path 2, which is bent in an L-shape.

Poppet valve 5 for opening and closing flow path 2 is arranged in the vertical direction such that the axial direction of shaft 5a of poppet valve 5 coincides with the axial direction of flow path 2 on the upstream side, and is slidable with respect to housing 3. Valve element 5b of poppet valve 5 can be seated on valve seat 4 from the upstream side of flow path 2 so as to close flow path 2.

Flange 6 is fixed to the upper end of shaft 5a of poppet valve 5, and spring 7 is elastically provided between flange 6 and housing 3 so as to bias poppet valve 5 to the upper side of FIG. 1, thereby causing valve element 5b of poppet valve 5 to be seated on valve seat 4 and close flow path 2 in the non-operating state.

The upper end portion of shaft 5a of poppet valve 5 is formed as rotation stopping part 5c having a rectangular cross section, and poppet valve 5 is prevented from rotating when sliding in the vertical direction by rotation stopping part 5c being slidably inserted into rotation stopping hole 3a that has a rectangular cross section and is provided in housing 3.

Note that rotation stopping means for preventing poppet valve 5 from rotating is not limited to the rotation stopping means of the present embodiment, and any rotation stopping means having an appropriate configuration may of course be employed.

Male thread part 5d is formed at an intermediate height position of shaft 5a of poppet valve 5, and is screwed into female thread part 11a that is formed on the shaft of driving gear 11 that is rotatably supported by housing 3.

Therefore, when driving gear 11 is rotated in the forward or reverse direction, poppet valve 5 can move up or down via thread parts 11a and 5c, making it possible to control an aperture of valve element 5b.

Driving gear 11 has, on the upper and lower portions of its central shaft, cylindrical sections 11b and 11c, and cylindrical sections 11b and 11c are pivotally supported respectively by roller bearings 12 provided in housing 3. As is conventionally known, each roller bearing 12 includes outer race 12a, a plurality of balls 12b, and inner race 12c, and outer race 12a is fixed to housing 3.

Cylindrical sections 11b and 11c of driving gear 11 are respectively fit into inner races 12c, and driving gear 11 is thereby pivotally supported by roller bearings 12, in other words, the cylindrical sections 11b and 11c of the driving gear 11 are respectively fitted into inner races 12c so as to be slidable in the axial direction.

Furthermore, coil spring 13 serving as biasing means is elastically provided between the lower surface of driving gear 11 and the upper surface of lower inner race 12c, so as to bias driving gear 11 to the upper side and hold driving gear 11 normally at a non-operating position at which the upper surface of driving gear 11 abuts on the lower surface of inner race 12c of upper roller bearing 12.

On the other hand, as will be described later, when driving gear 11 has moved downward against the elastic force of coil spring 13, the lower end surface of lower cylindrical section 11c of driving gear 11 abuts on fixing part 25 such as sealing means that is fixed to housing 3.

Small gear 21a of pinion 21 engages with driving gear 11, and large gear 21b of pinion 21 engages with driving pinion 23 that is fixed to driving shaft 22a of motor 22 serving as driving means.

Therefore, by rotating driving pinion 23 in the forward or reverse direction with motor 22, it is possible to rotate driving gear 11 in the forward or reverse direction via pinion 21 and thereby to move poppet valve 5 up or down via thread parts 11a and 5c, as described above.

Pinion 21 is rotatably and pivotally supported by shaft 24, and shaft 24, shaft 5a of poppet valve 5, and driving shaft 22a of motor 22 are arranged in parallel to one another in the vertical direction.

In the present embodiment, driving gear 11, smaller gear 21a and larger gear 21b of pinion 21, and the driving pinion 23 are configured by spur wheels, and the face width (length in the axial direction) of smaller gear 21a of pinion 21 is set to be larger than the face width of driving gear 11.

Furthermore, engagement of driving gear 11 with smaller gear 21a of pinion 21 allows driving gear 11 to move downward against the elastic force of spring 13 from the upper non-operating position while maintaining the engaging state of driving gear 11 with smaller gear 21a.

Sensor 28 is provided above poppet valve 5 in order to detect the amount of up and down movement of poppet valve 5, that is, an aperture of poppet valve 5, and contact 28a of sensor 28 is in contact with the upper end surface of poppet valve 5. Contact 28a is configured to be able to move up and down tracking the up and down movement of poppet valve 5, and thereby to monitor the absolute elevated position of poppet valve 5.

A signal from sensor 28 is input to control unit 29, and, while receiving the signal from sensor 28, control unit 29 can control, by controlling motor 22, the position at which poppet valve 5 has moved up or down, that is, an aperture of poppet valve.

According to the above-described configuration, in the non-operating state, valve element 5b of poppet valve 5 is seated on valve seat 4 and closes flow path 2, and driving gear 11 is held in the state of being biased at the non-operating position above by spring 13.

When separating, in this state, valve element 5b of poppet valve 5 from valve seat 4 to open flow path 2, control unit 29 rotates driving pinion 23 in the forward direction with motor 22, and thereby rotates driving gear 11 in the forward direction via pinion 21, which is arranged between driving pinion 23 and driving gear 11.

With this, poppet valve 5 moves down via thread part 11a formed on driving gear 11 and thread part 5d formed on poppet valve 5, and thereby valve element 5b of poppet valve 5 is separated from valve seat 4.

The amount of down movement of poppet valve 5 is detected by sensor 28, and a signal from sensor 28 is input to control unit 29. Accordingly, control unit 29 controls motor 22 so that the amount of down movement of poppet valve 5 is appropriate and the aperture of flow path 2 has a required size.

When moving poppet valve 5 up to close flow path 2, control unit 29 rotates driving pinion 23 in the reverse direction with motor 22, and thereby rotates driving gear 11 in the reverse direction via pinion 21, which is arranged between driving pinion 23 and driving gear 11.

With this, the poppet valve 5 moves up and then valve element 5b of poppet valve 5 is seated on valve seat 4. When sensor 28 has detected that valve element 5b of poppet valve 5 is seated on valve seat 4, control unit 29 immediately stops supplying power to motor 22 so as to halt driving gear 11, but driving gear 11 continues to rotate in the reverse direction slightly due to the inertia force.

Therefore, poppet valve 5 cannot move up because the valve element 5b thereof is seated on valve seat 4, and therefore following the reverse rotation of driving gear 11, driving gear 11 moves downward while rotating against the elastic force of spring 13 from the above-described upper non-operating position (see the position of driving gear 11 on the right side of center line O of FIG. 1). Accordingly, it is possible to cushion an impact that is applied to driving gear 11, pinion 21 located in the middle, driving pinion 23, or motor 22, as compared with the case where driving gear 11 stops suddenly.

Furthermore, although the inertia force that is applied to driving gear 11 or the like will be increased when the up or down movement of poppet valve 5 is accelerated to a higher speed and the responsivity of control for opening and closing flow path 2 is improved, driving gear 11 can move further downward from the non-operating position even in the case of the increased inertia force, and can easily absorb the increased inertia force.

Meanwhile, in a case where there is provided no mechanism for absorbing an impact or a case where the mechanism has insufficient absorption capacity, it is necessary to perform control such that the valve closing speed is decreased immediately before valve element 5b of poppet valve 5 is seated on valve seat 4 so that valve element 5b is slowly seated on valve seat 4. In this case, however, closing the valve will take longer by an amount corresponding to the decrease in valve closing speed, resulting in a deterioration in responsivity.

In contrast, since, in the present embodiment, a large inertia force can easily be absorbed as described above, valve element 5b of poppet valve 5 can rapidly be seated on valve seat 4, thereby realizing a favorable responsivity required for closing the valve.

In the state in which poppet valve 5 is brought into contact with valve seat 4 under pressure, when a voltage of a required magnitude is applied to motor 22 to further rotate driving gear 11 in the reverse direction, driving gear 11 moves from the non-operating position in the axial direction (to the position on the lower portion of FIG. 1 at which the valve remains closed) via thread part 11a and shaft 5a. When the lower end section of driving gear 11 is brought into contact with fixing part 25, which is formed integrally with housing 3, the movement of driving gear 11 is restricted and generates a load that biases poppet valve 5 in the direction in which the valve is fully closed.

Furthermore, after the power supply to motor 22 is stopped, driving gear 11 that has moved down from the non-operating position immediately returns to the initial non-operating position with the elastic force of spring 13.

On the other hand, it is also possible to use only the elastic force of spring 13 without supplying power to motor 22. That is, it is possible to set the elastic force of spring 13 to one that prevents driving gear 11 from rotating in the forward direction about the shaft 5a of poppet valve 5 and from returning to the initial position, by appropriately setting the condition under which male thread part 5d of poppet valve 5 is screwed into female thread part 11a of driving gear 11.

In this state, driving gear 11 that has moved downward from the non-operating position with the inertia force is constantly biased upward by the elastic force of spring 13, and thus valve element 5b of poppet valve 5 can be pressed to the valve seat 4 by the biasing force, making it possible to close flow path 2 more stably.

At that time, it is also possible to cause driving gear 11 to move downward from the non-operating position more actively. That is, in the case of using an inertia force, power supply to motor 22 is stopped when valve element 5b of poppet valve 5 has been seated on valve seat 4, but a configuration is also possible in which, even when valve element 5b of poppet valve 5 is seated on valve seat 4, driving gear 11 continues the reverse rotation with a voltage of the required magnitude applied to motor 22, and thereby moves downward from the non-operating position by a required amount. With this, spring 13 can be compressed, and poppet valve 5 is brought into contact with valve seat 4 under pressure with a larger elastic force.

In this case, even when driving gear 11 returns to the initial non-operating position with the elastic force of spring 13, continuously applying a voltage of a required magnitude to motor 22 can hold driving gear 11 at a position that is displaced with respect to the non-operating position to the lower side by a required amount.

Furthermore, in order to move poppet valve 5 down in a case where driving gear 11 is maintained in the state in which it has moved down from the non-operating position, driving gear 11 rotates in the forward direction using the elastic force of spring 13 and motor 22 to return to the initial non-operating position, and then moves poppet valve 5 down. However, in the present embodiment, since the position at which poppet valve 5 has moved up or down is constantly being detected by sensor 28, the amount of the down movement can immediately be detected by sensor 28 when poppet valve 5 has started down movement.

Furthermore, in the present embodiment, since the position at which poppet valve 5 has moved up or down is constantly being detected by sensor 28, the phenomenon in which valve element 5b of poppet valve 5 is not seated on valve seat 4 despite being controlled to be seated on valve seat 4 because a foreign substance was jammed for example can be detected by sensor 28.

Therefore, it is possible to prevent an accidental engine fire due to gas leakage occurring when the valve is completely closed.

The invention claimed is:

1. A valve device comprising:
a poppet valve that is brought into and out of contact with a valve seat to open and close a flow path;
a thread part that is formed on a shaft of the poppet valve;
a driving gear into which the thread part is screwed;
a pinion that engages with and rotates the driving gear; and
a driver for rotationally driving the pinion,
wherein the poppet valve is moved to advance or retreat depending on a rotational direction of the driving gear to control opening and closing of the flow path, by the driver rotating the driving gear via the pinion,
the driving gear is provided so as to advance and retreat in an axial direction of the pinion and an axial direction of the poppet valve while remaining engaged with the pinion,
the driving gear is held at a predetermined non-operating position by a biasing member, and moves, when further rotated, against a biasing force of the biasing member from the non-operating position in an axial direction thereof even when the poppet valve is seated on the valve seat and has stopped moving, and absorbs an impact that is applied to the driver,
the driving gear has a first cylindrical section on an upper portion of the shaft, and a second cylindrical section on a lower portion of the shaft,
the first and second cylindrical sections of the driving gear are fit into inner races of roller bearings so that the driving gear is pivotally supported by the roller bearings, and each roller bearing has an outer race that is fixed to a housing of the valve device wherein the driving gear is provided slidably in the axial direction with respect to the inner races.

2. The valve device according to claim 1, wherein, in a state in which the flow path is closed by the poppet valve, the poppet valve is brought into contact with the valve seat under pressure by the biasing force of the biasing member or the driver.

3. The valve device according to claim 1, wherein the biasing member is a spring that is elastically provided between the driving gear and the inner race accommodating the second cylindrical portion.

4. The valve device according to claim 1 further comprising a sensor for detecting an amount of up and down movement of the poppet valve, wherein the sensor monitors an absolute position at which the poppet valve has moved up or down.

* * * * *